(12) United States Patent
Zlotnick et al.

(10) Patent No.: US 6,748,123 B1
(45) Date of Patent: Jun. 8, 2004

(54) DISPLAYING MULTI-LINE FIELDS FOR KEY-IN

(75) Inventors: Aviad Zlotnick, Mizpe Netofa (IL); Ronen Shevach, Netanya (IL)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 09/651,909

(22) Filed: Aug. 30, 2000

(51) Int. Cl.[7] .................................................. G06K 9/03
(52) U.S. Cl. ..................... 382/311; 382/189; 382/290; 382/292; 715/507; 715/529; 715/534; 715/541
(58) Field of Search ................................. 382/290, 292, 382/309, 311; 715/505, 507, 528–531, 534, 541

(56) References Cited

U.S. PATENT DOCUMENTS

| | | | | |
|---|---|---|---|---|
| 5,943,680 A | * | 8/1999 | Shimizu et al. | 715/528 |
| 5,953,735 A | * | 9/1999 | Forcier | 715/541 |
| 6,269,189 B1 | * | 7/2001 | Chanod | 382/229 |

* cited by examiner

*Primary Examiner*—Jayanti K. Patel
*Assistant Examiner*—Gregory Desire
(74) *Attorney, Agent, or Firm*—Darby & Darby

(57) ABSTRACT

A method for displaying data includes receiving an input image of alphanumeric characters appearing on first and second lines. The characters are concatenated into a single line so as to generate an output image in which the characters from the second line follow the characters from the first line substantially without interruption therebetween, while maintaining a visual distinction between the characters from the first line and the characters from the second line.

15 Claims, 2 Drawing Sheets

Love is nowhere

Love is nowhere

DISPLAYING MULTI-LINE FIELDS FOR KEY-IN

FIELD OF THE INVENTION

The present invention relates generally to automated processing of document forms, and specifically to enhancing efficiency of human operators in keying into a computer information that is filled into such forms.

BACKGROUND OF THE INVENTION

Despite progress in automation of data gathering functions, much large-scale data collection, such as census taking, is still carried out by manually filling in forms. The data are typically written by hand into designated fields on a preprinted form. Although optical character recognition (OCR) can generally be used to read at least a portion of the forms automatically by computer, there are still usually many fields that cannot be deciphered by OCR, at least not with a desired level of confidence. These fields must then be processed by a human operator, who manually keys the field contents into a computer. This manual key-in is typically the most costly part of large-scale data gathering.

As a rule, the forms to be processed are scanned into a computer, and an image of each field that is to be keyed in is displayed on the operator's computer screen. In order to reduce the time that the operator spends keying each field, while decreasing the likelihood of operator errors, it is important to display the field images in the clearest and most convenient possible fashion.

SUMMARY OF THE INVENTION

Preferred embodiments of the present invention provide improved methods and systems for displaying fields from filled-in forms, to be keyed into a computer terminal by an operator. The present invention addresses the problem of multi-line fields, wherein information is filled into a form on -two or more successive lines. In this situation, it is not always clear to the operator whether the first character on the second (or subsequent) line is a continuation of the last word in the preceding line, which is thus split over the two lines, or whether it is the start of a new word.

In preferred embodiments of the present invention, in order to facilitate rapid key-in and assist the operator in intuitively resolving this ambiguity, the multiple lines of the field are concatenated together into a single line on the operator's display screen, while maintaining a visual distinction between the characters in each succeeding line. No artificial line break characters or spaces between the contents of successive lines are inserted in the display, however, since these elements tend to confuse the operator and might even be keyed in by the operator as part of the field contents. Preferably, the characters in each successive line are shifted slightly up or down on the display relative to the characters from the preceding line. The offset should be sufficient to show the line break, but not so great as to interrupt the visual continuity of the of the concatenated line. Alternatively, other means, such as color variations, may be used to visually distinguish the characters in successive lines.

There is therefore provided, in accordance with a preferred embodiment of the present invention, a method for displaying data, including:

receiving an input image of alphanumeric characters appearing on first and second lines; and concatenating the characters into a single line so as to generate an output image in which the characters from the second line follow the characters from the first line substantially without interruption therebetween, while maintaining a visual distinction between the characters from the first line and the characters from the second line.

Preferably, concatenating the characters includes displacing the characters from the second line transversely relative to the characters from the first line, most preferably by a transverse distance that is substantially less than a height of the single line. In a preferred embodiment, receiving the input image includes receiving an image that includes further alphanumeric characters appearing on a third line, and concatenating the characters includes adding the characters from the third line to the characters in the single line, such that the characters in the third line are substantially aligned transversely with the characters in the first line.

Alternatively or additionally, concatenating the characters includes displaying the characters from the first line in a first color, and the characters from the second line in a second color, different from the first color.

Preferably, receiving the input image includes receiving an image of a field from a form document, the field including the first and second lines, which are filled in with the alphanumeric characters, and the method includes displaying the output image on a computer terminal, for key-in of the characters by an operator of the terminal.

There is also provided, in accordance with a preferred embodiment of the present invention, apparatus for displaying data, including a document image processor, which is adapted to receive an input image of alphanumeric characters appearing on first and second lines, and to concatenate the characters into a single line so as to generate an output image in which the characters from the second line follow the characters from the first line substantially without interruption therebetween, while maintaining a visual distinction between the characters from the first line and the characters from the second line.

Preferably, the apparatus includes a display screen, which is driven by the processor to display the output image, and a keyboard, coupled to the processor, for key-in of the characters by an operator viewing the output image on the screen.

There is additionally provided, in accordance with a preferred embodiment of the present invention, a computer software product, including a computer-readable medium in which program instructions are stored, which instructions, when read by a computer that receives an input image of alphanumeric characters appearing on first and second lines, causes the computer to concatenate the characters into a single line so as to generate an output image in which the characters from the second line follow the characters from the first line substantially without interruption therebetween, while maintaining a visual distinction between the characters from the first line and the characters from the second line.

The present invention will be more fully understood from the following detailed description of the preferred embodiments thereof, taken together with the drawings in which:

DETAILED DESCRIPTION OF PREFERRED EMBODIMENTS

Figure 1:
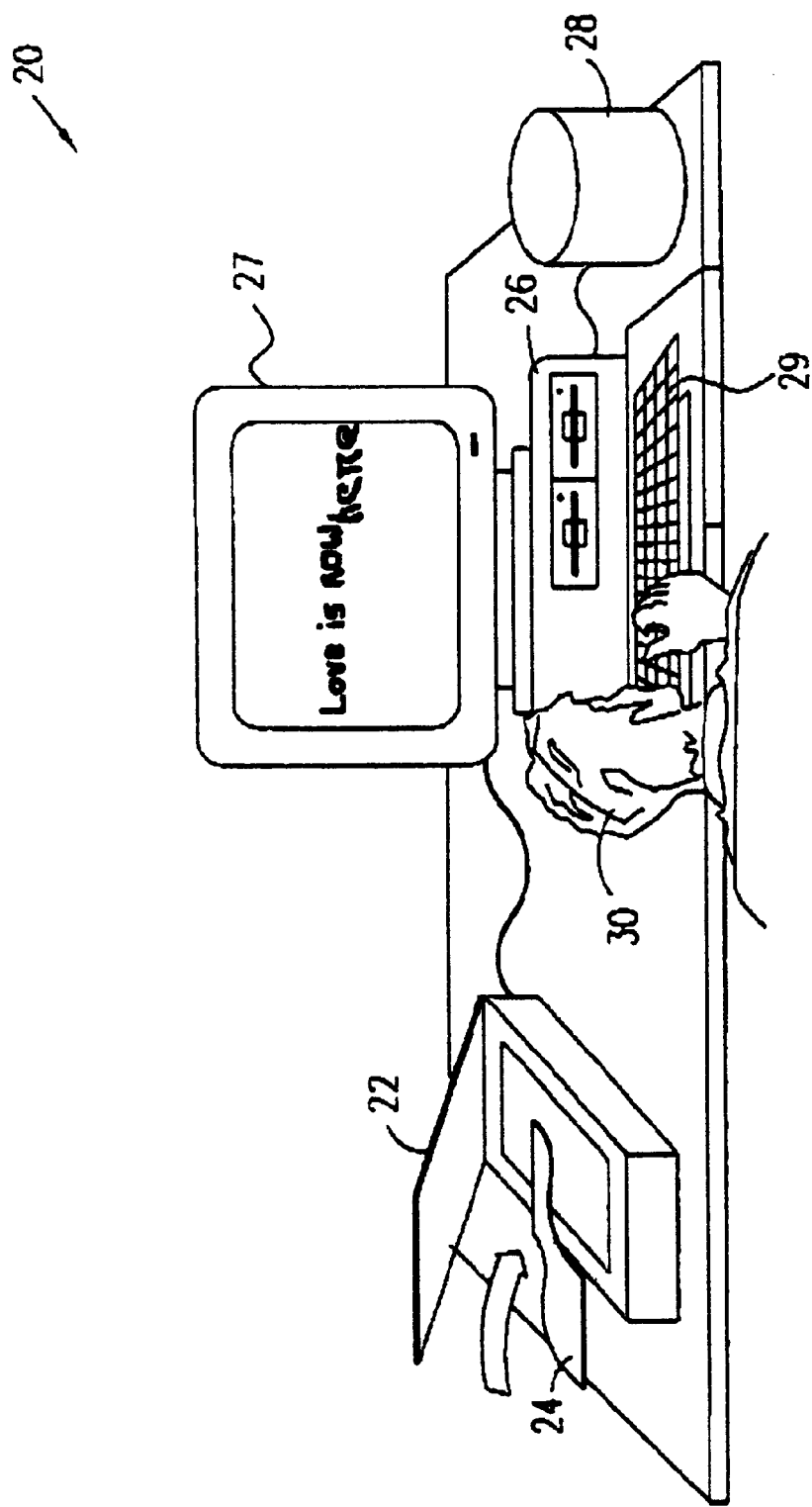
FIG. 1 is a schematic, pictorial illustration of a system for data key-in, in accordance with a preferred embodiment of the present invention.
Figures 2, 3, 4:
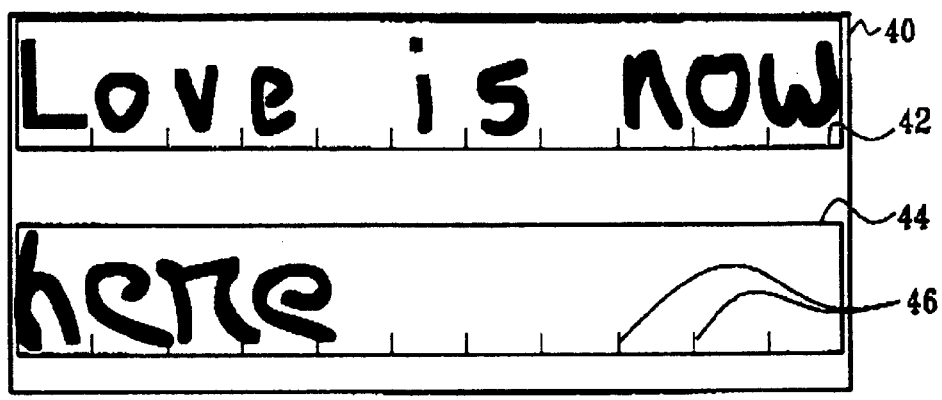
FIG. 2 is a schematic representation of a multi-line text field.
FIG. 3 is a schematic representation of a display of the contents of the multi-line field of FIG. 2, as is known in the art.
FIG. 4 is a schematic representation of a display of the contents of the multi-line field of FIG. 2, in accordance with a preferred embodiment of the present invention.

FIG. 1 is a schematic, pictorial illustration of a system 20 for keying in of information from form documents, in accordance with a preferred embodiment of the present invention. System 20 comprises a scanner 22, or any suitable type of image capture device known in the art. The scanner receives and scans a document 24 comprising a preprinted form, which is typically filled in with handwritten, typed or printed characters. The scanner thus captures an image of the document and conveys the corresponding image data to an operator terminal 26, which typically comprises a suitable general-purpose computer or a client terminal linked to a computer server (not shown). Alternatively, the image is provided to the terminal from a memory 28 or from another source. Preferably, the image is broken into individual fields, using methods of image processing known in the art, for presentation to an operator 30 on a display screen 27. Some of these fields typically comprise multiple lines of text, as shown in FIG. 2 below. The operator views the image of each field on screen 27 and keys the contents of the field into terminal 26 using a keyboard 29. The key-in results are typically stored in memory 28 and are then recalled for subsequent processing.

The document processing and presentation functions described hereinbelow are preferably performed using software, which implements an embodiment of the present invention, running on terminal 26 and/or on a server that communicates with the terminal. The software is typically supplied on tangible media, such as diskettes or CD-ROM, for installation on the terminal and/or server. Alternatively, the software may be downloaded to the terminal and/or server via a network connection or other electronic link. Further alternatively, aspects of the functions described hereinbelow may be carried out by dedicated, hard-wired elements or by a digital signal processor.

FIG. 2 is a schematic representation of a field 40 in a form, such as document 24, comprising first and second lines 42 and 44. Because every alphanumeric character in the field must be written in a single space, as indicated by tick marks 46, ambiguity is created at the end of first line 42. It is not clear whether the last group of letters in the first line ("now") is a fragment of a longer word ("nowhere") that continues on the second line, or whether "now" and "here" are meant to be separate words, between which the person who filled out the form neglected to leave a space because of the line break. In the present example, this ambiguity may be irresolvable, but ordinarily, operator 30 is required to use his intuition in order to choose between the two variant readings.

FIG. 3 is a schematic representation of a presentation of field 40 on the display screen of a key-in terminal, as is known in the art. In order to facilitate rapid and accurate key-in, it is common to concatenate together the lines of a multi-line field, as shown in this figure. The operator viewing this display will surely choose the reading "Love is nowhere," and will not even consider the alternative reading, "Love is now here," which may be the correct one. On the other hand, leaving a space in the display between the contents of the first and second lines will probably lead the operator to miss the possible reading "Love is nowhere." Inserting a line break character, such as a slash ("/"), between the contents of the two lines can be similarly misleading and may even cause the operator to key in the line break character itself.

FIG. 4 is a schematic representation of a presentation of field 40 on screen 27 of system 20, in accordance with a preferred embodiment of the present invention. The contents of lines 42 and 44 are concatenated together in a single line, with no spaces or separating characters. The contents of the second line, however, are offset vertically by a small amount relative to the first line, so that it is clear that there may be a linguistic separation between "now" and "here." This transverse displacement of the second line is preferably by a distance substantially less than the height of the line itself. If the field in question contains more than two lines, then the line offsets preferably alternate, so that the third line is displayed back at the level of first line 42, the fourth line is displayed at the level of second line 44, and so forth.

Alternatively, the first and second lines may be concatenated without vertical offset, as in FIG. 3, but with the distinction between the two lines marked by other visual effects, such as color. For example, the characters in first line 42 may appear on screen 27 in one color, and those in second line 44 in another color, or the contents of the two lines may be presented against different background colors. Alternatively, the characters from lines 42 and 44 may have different visual textures. Other means of distinguishing the characters in successive lines, without insertion of spaces or line break characters therebetween, will be apparent to those skilled in the art and are considered to be within the scope of the present invention.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for displaying data, comprising:

receiving an input image of alphanumeric characters appearing on first and second lines; and concatenating the characters into a single line so as to generate an output image in which the characters from the second line follow the characters from the first line substantially without interruption therebetween, while maintaining a visual distinction between the characters from the first line and the characters from the second line wherein concatenating the characters comprises displacing the characters from the second line transversely relative to the characters from the first line, and wherein displacing the characters comprises displacing the characters by a transverse distance that is substantially less than a height of the single line.

2. A method according to claim 1, wherein receiving the input image comprises receiving an image that includes further alphanumeric characters appearing on a third line, and wherein concatenating the characters comprises adding the characters from the third line to the characters in the single line, such that the characters in the third line are substantially aligned transversely with the characters in the first line.

3. A method according to claim 1, wherein concatenating the characters comprises displaying the characters from the first line in a first color, and the characters from the second line in a second color, different from the first color.

4. A method according to claim 1, wherein receiving the input image comprises receiving an image of a field from a form document, the field including the first and second lines, which are filled in with the alphanumeric characters.

5. A method according to claim 4, and comprising displaying the output image on a computer terminal, for key-in of the characters by an operator of the terminal.

6. Apparatus for displaying data, comprising a document image processor, which is adapted to receive an input image of alphanumeric characters appearing on first and second lines, and to concatenate the characters into a single line so as to generate an output image in which the characters from the second line follow the characters from the first line substantially without interruption therebetween, while maintaining a visual distinction between the characters from the first line and the characters from the second line, wherein the characters from the second line are displaced transversely relative to the characters from the first line in the output image, and wherein the characters are displaced by a transverse distance that is substantially less than a height of the single line.

7. Apparatus according to claim 6, wherein when the input image includes further alphanumeric characters appearing on a third line, the characters from the third line are added to the characters in the single line, such that the characters in the third line are substantially aligned transversely with the characters in the first line.

8. Apparatus according to claim 6, wherein the characters from the first line are displayed in the output image in a first color, and the characters from the second line are displayed in the output image in a second color, different from the first color.

9. Apparatus according to claim 6, wherein the input image comprises an image of a field from a form document, the field including the first and second lines, which are filled in with the alphanumeric characters.

10. Apparatus according to claim 9, and comprising a display screen, which is driven by the processor to display the output image, and a keyboard, coupled to the processor, for key-in of the characters by an operator viewing the output image on the screen.

11. A computer software product, comprising a computer-readable medium in which program instructions are stored, which instructions, when read by a computer that receives an input image of alphanumeric characters appearing on first and second lines, causes the computer to concatenate the characters into a single line so as to generate an output image in which the characters from the second line follow the characters from the first line substantially without interruption therebetween, while maintaining a visual distinction between the characters from the first line and the characters from the second line, wherein the instructions cause the computer to displace the characters from the second line transversely relative to the characters from the first line, and wherein the characters are displaced by a transverse distance that is substantially less than a height of the single line.

12. A product according to claim 11, wherein when the image includes further alphanumeric characters appearing on a third line, the instructions cause the computer to add the characters from the third line to the characters in the single line, such that the characters in the third line are substantially aligned transversely with the characters in the first line.

13. A product according to claim 11, wherein the instructions cause the computer to display the characters from the first line in a first color, and the characters from the second line in a second color, different from the first color.

14. A product according to claim 11, wherein the input image comprises an image of a field from a form document, the field including the first and second lines, which are filled in with the alphanumeric characters.

15. A product according to claim 14, wherein the instructions cause the computer to display the output image on a computer terminal, for key-in of the characters by an operator of the terminal.

* * * * *